United States Patent
Tong et al.

(10) Patent No.: US 9,136,923 B2
(45) Date of Patent: *Sep. 15, 2015

(54) WIRELESS FEEDBACK SYSTEM AND METHOD

(71) Applicant: Apple Inc., Cupertino, CA (US)

(72) Inventors: Wen Tong, Ottawa (CA); Hosein Nikopour, Ottawa (CA); Amir Keyvam Khandani, Kitchener (CA); Hua Xu, Nepean (CA); Ming Jia, Ottawa (CA); Peiying Zhu, Kanata (CA); Dong-Sheng Yu, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,053

(22) Filed: Nov. 23, 2014

(65) Prior Publication Data

US 2015/0103938 A1 Apr. 16, 2015

Related U.S. Application Data

(63) Continuation of application No. 14/072,779, filed on Nov. 5, 2013, now Pat. No. 8,897,384, which is a continuation of application No. 13/464,640, filed on May 4, 2012, now Pat. No. 8,605,812, which is a (Continued)

(51) Int. Cl.
*H04B 7/04* (2006.01)
*H04B 7/06* (2006.01)
*H04L 29/06* (2006.01)

(52) U.S. Cl.
CPC ............ *H04B 7/0417* (2013.01); *H04B 7/0456* (2013.01); *H04B 7/0634* (2013.01); *H04B 7/0639* (2013.01); *H04L 69/04* (2013.01); *H04L 69/14* (2013.01)

(58) Field of Classification Search
USPC .......................... 375/267, 299, 260, 347, 349
See application file for complete search history.

(56) References Cited

U.S. PATENT DOCUMENTS 6,192,256 B1 2/2001 Whinnett
6,859,503 B2 2/2005 Pautler (Continued)

OTHER PUBLICATIONS

Love, David J. et al., "What is the value of Limited Feedback for MIMO Channels?" IEEE Communications Magazine, vol. 42, issue 10, pp. 54-59, Oct. 2004, http://www.ece.northwestern.edu/-mh/Txrx/comm_mag.pdf.

(Continued)

*Primary Examiner* — Kabir A Timory
(74) *Attorney, Agent, or Firm* — Meyertons, Hood, Kivlin, Kowert & Goetzel, P.C.

(57) ABSTRACT

A codebook C is provided in a MIMO transmitter as well as a MIMO receiver. The codebook C will include M codewords $c_i$, where i is a unique codeword index for each codeword $c_i$. Each codeword defines weighting factors to apply to the MIMO signals, and may correspond to channel matrices or vectors to apply to the MIMO signals prior to transmission from the respective antennas of the MIMO transmitter. The present invention creates codeword subsets $S_1$ for each codeword $c_1$ of the codebook C. Each codeword subset $S_1$ defines L codewords $c_j$, which are selected from all the codewords $c_j$ in the codebook C. The codewords $c_j$ in a codeword subset $S_1$ are the L codewords in the entire codebook that best correlate with the corresponding codeword $c_i$.

10 Claims, 10 Drawing Sheets

Related U.S. Application Data continuation of application No. 12/066,322, filed as application No. PCT/IB2006/001157 on May 4, 2006, now Pat. No. 8,189,714.

(60) Provisional application No. 60/677,493, filed on May 4, 2005.

(56) References Cited

U.S. PATENT DOCUMENTS

| | | |
|---|---|---|
| 7,895,044 B2 | 2/2011 | Lin |
| 2003/0185309 A1 | 10/2003 | Pautler |
| 2003/0235255 A1 | 12/2003 | Ketchum |
| 2004/0066761 A1 | 4/2004 | Giannakis |
| 2004/0120411 A1* | 6/2004 | Walton et al. ............... 375/260 |
| 2005/0249304 A1 | 11/2005 | Takano et al. |
| 2006/0092054 A1 | 5/2006 | Li |
| 2006/0093065 A1 | 5/2006 | Thomas |
| 2006/0203891 A1 | 9/2006 | Sampath |
| 2010/0115358 A1* | 5/2010 | Kotecha et al. ............... 714/748 |

OTHER PUBLICATIONS

Raghavan, Vasanthan et al., "Near-Optimal Codebook Constructions for limited Feedback Beamforming in Correlated MIMO Channels with Few Antennas," in Proc. of IEEE International Symposium on Information Theory, Seattle, WA, Jul. 9-14, 2006, http://dune.ece.wisc.edu/pdfs/vas_fb_isito6.pdf.

International Search Report for PCT/182006/001157, mailed Sep. 28, 2006.

Written Opinion of the International Search Authority for PCT/182006/001157, mailed Sep. 28, 2006.

* cited by examiner

| CODEBOOK C | |
|---|---|
| CODEWORD INDEX $i$ | CODEWORD $c_i$ |
| 0 | $c_0$ |
| 1 | $c_1$ |
| 2 | $c_2$ |
| 3 | $c_3$ |
| 4 | $c_4$ |
| ⋮ | ⋮ |
| 59 | $c_{59}$ |
| 60 | $c_{60}$ |
| 61 | $c_{61}$ |
| 62 | $c_{62}$ |
| 63 | $c_{63}$ |

$i = 0, 1, 2, \ldots M-1; M = 64$

FIG. 2

| CODEBOOK C |||
|---|---|---|
| CODEWORD INDEX $i$ | CODEWORD $c_i$ | CODEWORD SUBSET $S_i$ |
| 0 | $c_0$ | $S_0$ |
| 1 | $c_1$ | $S_1$ |
| 2 | $c_2$ | $S_2$ |
| 3 | $c_3$ | $S_3$ |
| 4 | $c_4$ | $S_4$ |
| ⋮ | ⋮ | ⋮ |
| 59 | $c_{59}$ | $S_{59}$ |
| 60 | $c_{60}$ | $S_{60}$ |
| 61 | $c_{61}$ | $S_{61}$ |
| 62 | $c_{62}$ | $S_{62}$ |
| 63 | $c_{63}$ | $S_{63}$ |

$i = 0, 1, 2, \ldots M-1; M = 64$

*FIG. 3*

| CODEWORD SUBSET $S_7$ ||
|---|---|
| SUBSET INDEX $k$ | CODEWORD $c_j$ |
| 0 | $c_3$ |
| 1 | $c_{13}$ |
| 2 | $c_{16}$ |
| 3 | $c_{25}$ |
| 4 | $c_{37}$ |
| 5 | $c_{41}$ |
| 6 | $c_{49}$ |
| 7 | $c_{60}$ |

$i = 7; k = 0, 1, 2, \ldots L-1; L = 8$

*FIG. 4*

WIRELESS FEEDBACK SYSTEM AND METHOD

PRIORITY CLAIM

This application is a continuation of and claims the benefit of priority from U.S. patent application Ser. No. 14/072,779, entitled "Wireless Feedback System and Method" and filed on Nov. 5, 2013 (issuing as U.S. Pat. No. 8,897,384 on Nov. 25, 2014), which is a continuation of and claims the benefit of priority from U.S. patent application Ser. No. 13/464,640, entitled "Wireless Feedback System and Method" and filed on May 4, 2012 (now U.S. Pat. No. 8,605,812, issued on Dec. 10, 2013), which is a continuation of and claims the benefit of priority from U.S. patent application Ser. No. 12/066,322, entitled "Wireless Feedback System and Method" and filed on Nov. 5, 2008 (now U.S. Pat. No. 8,189,714, issued on May 29, 2012), which is a 35 U.S.C. §371 National Application of and claims the benefit of priority from International Patent Application Serial No. PCT/IB2006/001157, entitled "Wireless Feedback System and Method" and filed on May 4, 2006, which claims the benefit of priority from U.S. Provisional Patent Application Ser. No. 60/677,493, entitled "Wireless Feedback System and Methods" and filed on May 4, 2005, all of which are fully incorporated herein by reference for all purposes and to the extent not inconsistent with this application.

FIELD OF THE INVENTION

The present invention relates to communications, and in particular to providing feedback information in a multiple-input multiple-output communication environment.

BACKGROUND OF THE INVENTION

Providing feedback in a multiple-input multiple-output (MIMO) communication environment has proven to significantly benefit performance. In early systems that employed feedback, weighting factors were created at the MIMO receiver based on channel conditions. A codeword was fed back from the MIMO receiver to the transmitter, which would apply the weighting factors to the respective signals to be transmitted from the different MIMO transmitter antennas. The weighting factors effectively pre-distorted the signals to be transmitted to reverse the effects of the communication channel. Accordingly, the signals received at the MIMO receiver's antennas approximated those that would have been received without weighting through a clear channel. Unfortunately, channel conditions frequently if not continuously change, and the weighting factors to represent channel conditions are data-intensive. In light of the limited bandwidth available for feedback, providing weighting factors for changing channel conditions became unfeasible.

In an effort to reduce the bandwidth required to provide feedback for a MIMO channel, designers developed codebooks, which are maintained at the MIMO transmitter and MIMO receiver. The codebooks include codewords, which are predefined weighting factors. These predefined weighting factors are configured to cover the range of possible channel conditions through a fixed number of discrete weighting factors. Each of the codewords in a codebook is associated with a codeword index. In operation, the MIMO receiver will systematically determine the channel conditions and select the most appropriate codeword in light of the channel conditions. Instead of sending the codeword, which includes the weighting factors, the MIMO receiver will send the codeword index to the MIMO transmitter over an appropriate feedback channel. The MIMO transmitter will receive the codeword index, obtain the weighting factors of the corresponding codeword, and apply those weighting factors to the signals to be transmitted from the different transmit antennas.

The number of codewords in the codebook impacts the bandwidth required for feedback and the performance enhancement associated with using feedback. Unfortunately, as the number of codewords increases, the bandwidth required to feed back the codeword index to the MIMO transmitter from the MIMO receiver increases. Although incorporating the use of codebooks and providing the codeword index instead of the entire codeword as feedback has provided performance enhancement over systems providing the entire codeword as feedback, there is still a need to increase the number of available codewords while minimizing the bandwidth required to provide feedback from the MIMO receiver to the MIMO transmitter.

SUMMARY OF THE INVENTION

A codebook C is provided in a MIMO transmitter as well as a MIMO receiver. The codebook C will include M codewords $c_i$, where i is a unique codeword index for each codeword $c_i$. Each codeword defines weighting factors to apply to MIMO signals, and may correspond to channel matrices or vectors to apply to the MIMO signals prior to transmission from the respective antennas of the MIMO transmitter. The present invention creates codeword subsets $S_i$ for each codeword $c_i$ of the codebook C. Each codeword subset $S_1$ defines L codewords $c_j$, which are selected from all the codewords $c_i$ in the codebook C. The codewords $c_j$ in a codeword subset $S_1$ are the L codewords in the entire codebook that best correlate with the corresponding codeword $c_1$.

In operation, the MIMO receiver will initially identify the channel conditions of the MIMO channel and search the entire codebook C for the most appropriate codeword $c_i$ based on the channel conditions of the MIMO channel. The MIMO receiver will then transmit the codeword index i corresponding to the selected codeword $c_i$ back to the MIMO transmitter as feedback. The MIMO transmitter will use the codeword index i to identify the codeword $c_i$ to employ when weighting the MIMO signals to be transmitted to the MIMO receiver. For a subsequent period of time or a given number of feedback instances, the MIMO receiver will again identify channel conditions for the MEMO channel. Instead of searching the entire codebook C for the best codeword $c_i$ in light of the channel conditions, the MIMO receiver will limit its search to the codeword subset $S_i$, which corresponds to the codeword $c_i$ that was selected from a search of the entire codebook C.

As such, a limited number of L codewords $c_j$ of the codeword subset $S_i$ are searched, instead of the M codewords $c_1$ of the entire codebook C. From the L codewords $c_j$ of the codeword subset $S_1$, the MIMO receiver will select the most appropriate codeword $c_j$ and then provide the subset index k corresponding to the selected codeword $c_j$ back to the MIMO transmitter as feedback. The MIMO transmitter will use the subset index k to identify the codeword $c_j$ from the codeword subset $S_i$ that corresponds to the codeword $c_1$, which was provided by the MIMO receiver in response to the most recent full codebook search. Once the appropriate codeword $c_j$ is obtained, the corresponding weighting factors are provided to the MIMO signals being transmitted to the MIMO receiver from the MIMO transmitter.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 illustrates a traditional codebook construction.

FIG. 3 illustrates a codebook constructed according to one embodiment of the present invention.

FIG. 4 illustrates a codeword subset according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
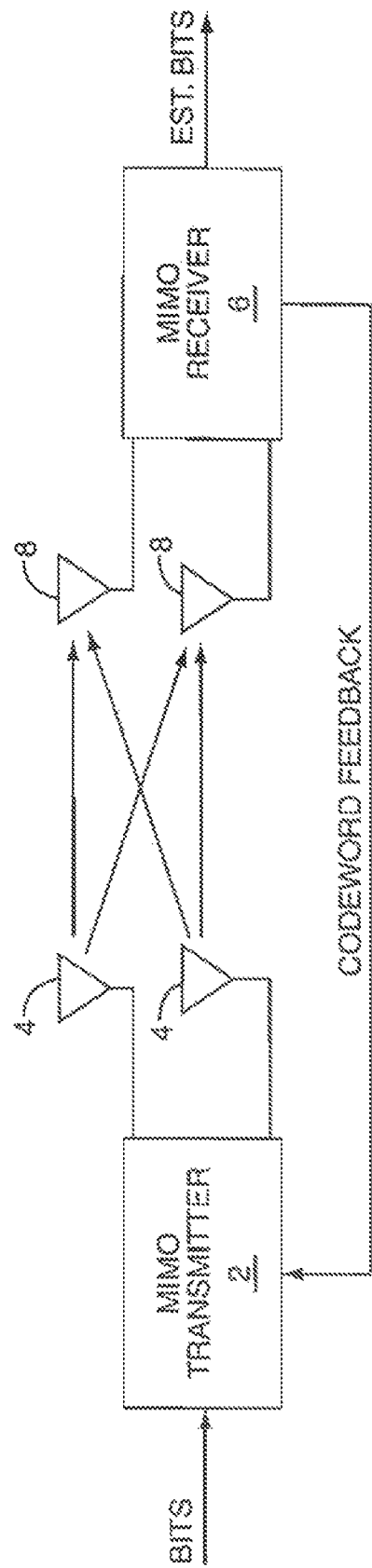
FIG. 1 is a block representation of a MIMO communication environment according to one embodiment of the present invention.

The present invention improves performance of multiple-input multiple-output (MIMO) communication systems. As shown in FIG. 1, a MIMO transmitter 2 has multiple transmit antennas 4 from which MIMO signals are transmitted over a MIMO communication channel to a MIMO receiver 6. The MIMO signals may be space-time coded (STC) signals, which are defined to be any spatially diverse signals or spatially multiplexed signals. As such, the signals transmitted from different transmit antennas 4 may be the same or different signals. The MIMO signals are received at the MIMO receiver by multiple receive antennas 8.

In operation, a codebook C, such as that illustrated in FIG. 2, is provided in the MIMO transmitter 2 as well as the MIMO receiver 6. The codebook C will include M codewords $c_i$, where i is a unique codeword index for each codeword $c_1$. In this example, there are 64 codewords $c_1$ (M=64), and as such, the codeword index i will range from zero to M−1. Each codeword defines weighting factors to apply to the MIMO signals, and may correspond to channel matrices or vectors to apply to the MIMO signals prior to transmission from the respective antennas 4 of the MIMO transmitter 2.

As noted above, current systems employing codebooks operate as follows. Initially, the MIMO receiver 6 will obtain channel conditions for the MIMO channel, and identify the codeword $c_i$ that would provide the best compensation of the MIMO signals in light of the channel conditions of the MIMO channel. The MIMO receiver 6 will search all of the codewords $c_i$ of the codebook C to determine the most appropriate codeword $c_i$. Once the codeword $c_i$ is determined, the MIMO receiver 6 will provide feedback to the MIMO transmitter 2 to identify the corresponding codeword index i. The MIMO transmitter 2 will use the received codeword index i to identify the corresponding codeword $c_1$ and apply the weighting factors defined by the codeword $c_1$ to the MIMO signals transmitted from the antennas 4. The process will continue, wherein the MIMO receiver 6 will systematically monitor the channel conditions of the MIMO channel and identify the most appropriate codeword $c_i$ by providing a search of all of the codewords $c_1$ in the codebook C.

The present invention improves upon the current state of the art by creating codeword subsets $S_1$ for each codeword $c_i$ of the codebook C, as illustrated in FIG. 3. Each codeword subset $S_1$ defines L codewords $c_j$, which are selected from all the codewords $c_i$ in the codebook C. The codewords $c_j$ in a codeword subset $S_i$ are the L codewords in the entire codebook that best correlate with the corresponding codeword $c_i$.

As illustrated in FIG. 4, a codeword subset $S_7$, which corresponds to the codeword $c_7$, is defined to include k codewords $c_j$, where k=0, 1, 2, . . . L−1, where L=8. As such, the codeword subset $S_7$ has eight codewords $c_j$. The codewords $c_j$ in the codeword subset $S_7$ are the eight codewords that best correlate with codeword $c_7$. In this example, the codeword subset $S_7$ associated with codeword $c_7$ is defined to include codewords $c_3$, $c_{13}$, $c_{16}$, $c_{25}$, $c_{37}$, $c_{41}$, $c_{49}$, and $c_{60}$. Notably, each codeword $c_i$ in the codebook C will have a corresponding codeword subset $S_1$, where the codewords $c_1$ in the codeword subset $S_1$ will differ from one codeword subset $S_1$ to another. Notably, the codeword $c_j$ of the codeword subset $S_1$ may or may not include the corresponding codeword $c_i$ with which the codeword subset $S_i$ is associated.

The codeword subsets $S_i$ are created by identifying the L codewords $c_j$ that have the highest correlations with $c_i$. Those skilled in the art will recognize various techniques for determining codewords $c_1$, $c_j$, that have the highest correlations. For example, identifying the codewords $c_1$, $c_j$ having the highest correlations may be determined using the normalized interproduct criterion defined as:

$$\langle c_i, c_j \rangle = \frac{c_i^* c_j}{\|c_i\| * \|c_j\|}.$$

In one embodiment, the subset index k, which is used to identify each of the codewords $c_j$ of the codeword subset $S_1$, will require $\log_2(L)$ bits, whereas the codebook index i requires $\log_2(M)$ bits. Thus, L is preferably significantly smaller than M. In the examples of FIGS. 2-4, the number of codewords $c_j$ (L) is eight times less than the number of codewords $c_1$ in the entire codebook C (M). Again, the codebook C, including the codeword subset extensions, is provided in the MIMO transmitter 2 as well as in the MIMO receiver 6. The codebook C will remain substantially fixed, and if there is a change to a codebook C in the MIMO transmitter 2, there must be corresponding changes in the MIMO receiver 6 to ensure that the codebooks C remain the same.

In operation, the MIMO receiver 6 will initially identify the channel conditions of the MIMO channel and search the entire codebook C for the most appropriate codeword $c_i$ based on the channel conditions of the MIMO channel. The MIMO receiver 6 will then transmit the codeword index 1 corresponding to the selected codeword $c_i$ back to the MIMO transmitter 2 as feedback. The MIMO transmitter 2 will use the codeword index i to identify the codeword $c_i$ to employ when weighting the MIMO signals to be transmitted to the MIMO receiver 6. For a subsequent period of time or a given number of feedback instances, the MIMO receiver 6 will again identify channel conditions for the MIMO channel. Instead of searching the entire codebook C for the best codeword $c_i$ in light of the channel conditions, the MIMO receiver 6 will limit its search to the codeword subset $S_1$, which corresponds to the codeword $c_i$ that was selected from a search of the entire codebook C.

As such, a limited number of L codewords $c_j$ of the codeword subset $S_i$ are searched, instead of the M codewords $c_i$ of the entire codebook C. From the L codewords $c_j$ of the codeword subset $S_i$, the MIMO receiver 6 will select the most appropriate codeword $c_j$ and then provide the subset index k corresponding to the selected codeword $c_j$ back to the MIMO transmitter 2 as feedback. The MIMO transmitter 2 will use the subset index k to identify the codeword $c_j$ from the codeword subset $S_i$ that corresponds to the codeword $c_1$, which was provided by the MIMO receiver 6 in response to the most recent full codebook search. Once the appropriate codeword $c_j$ is obtained, the corresponding weighting factors are provided to the MIMO signals being transmitted to the MIMO receiver 6 from the MIMO transmitter 2.

Figure 5:
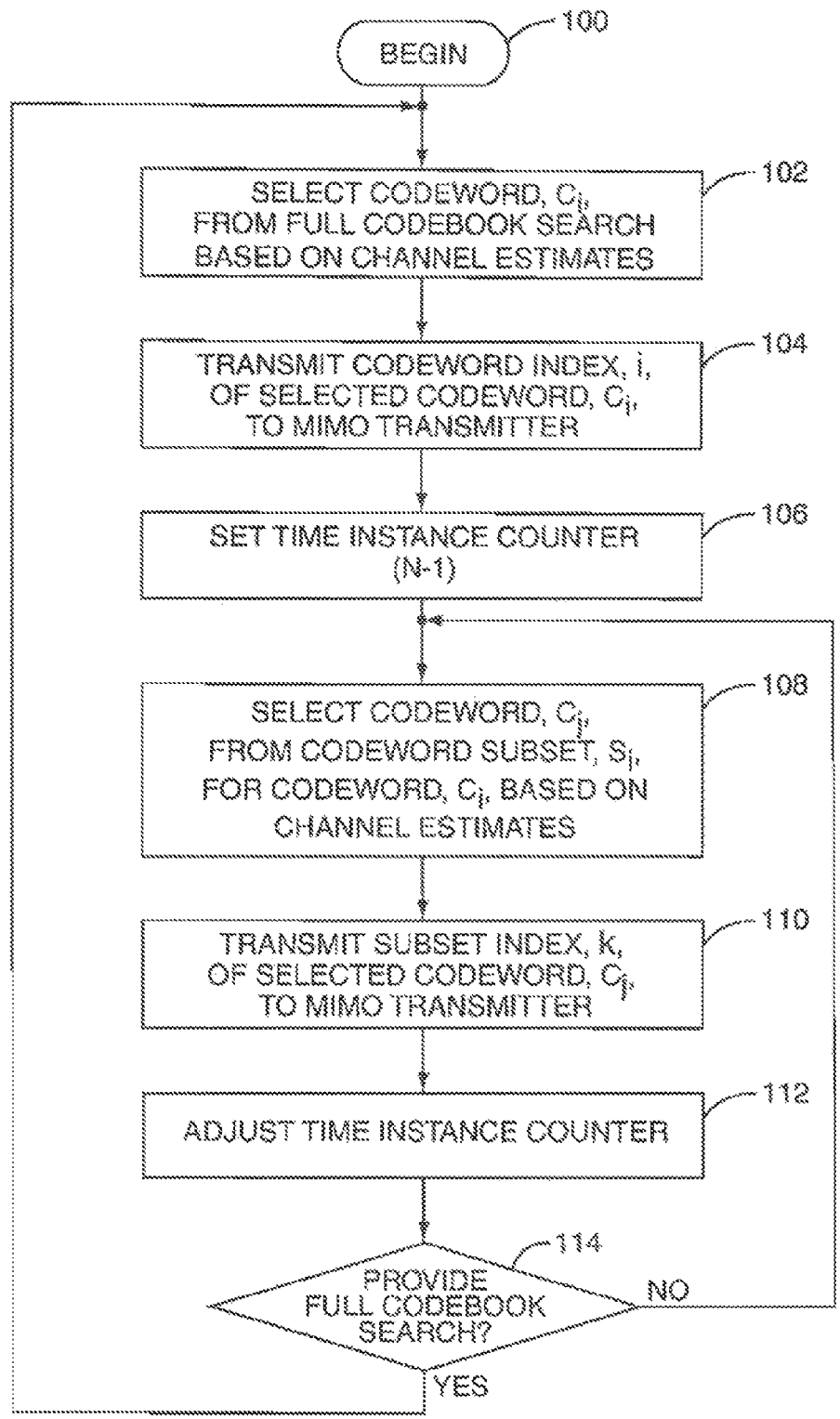
FIG. 5 is a flow diagram illustrating operation of a MIMO receiver according to one embodiment of the present invention.

With reference to FIG. 5, a flow diagram illustrating operation of the MIMO receiver 6 is provided. Operation begins (step 100) where the MIMO receiver 6 selects a codeword $c_1$ from a full codebook search based on channel estimates (step 102). The MIMO receiver 6 will transmit the codeword index i of the selected codeword $c_1$ to the MIMO transmitter 2 (step 104). After a full codebook search, the MIMO receiver 6 may set a time instance counter (N−1) (step 106) and then proceed by selecting a codeword $c_j$ from codeword subset $S_1$ for the codeword $c_1$ based on new channel estimates (step 108). The MIMO receiver 6 will transmit the subset index k of the selected codeword $c_j$ to the MIMO transmitter 2 (step 110) and adjust the time instance counter accordingly (step 112). Based on the time instance counter, the MIMO receiver 6 will determine whether or not a full codebook search is required (step 114). If a full codebook search is not required, the MIMO receiver 6 will once again select a codeword $c_j$ from the codeword subset $S_i$ for the codeword $c_i$ based on new channel estimates (step 108). Notably, the new channel estimates may result in a different codeword $c_j$ being selected from the same codeword subset $S_1$ for consecutive feedback instances. Further, the codeword subset $S_1$ will not change until a full codebook search is provided. As such, until the time instance counter is incremented to N−1 or decremented to zero, the iterative process of selecting a codeword $c_j$ from the codeword subset $S_1$ and transmitting the corresponding subset index k back to the MIMO transmitter 2 repeats.

When it is time to provide a full codebook search (step 114), the overall process will begin anew, wherein a codeword $c_i$ is selected from a full codebook search based on new channel estimates (step 102). Codeword index i is transmitted to the MIMO transmitter 2 (step 104), and the time instance counter is set (step 106). At this point, a new codeword subset $S_1$ is selected, assuming channel estimates have changed from the last full codebook search, and subsequent feedback instances will result in searches of only the appropriate codeword subset $S_1$ until a full codebook search is needed.

Figure 6:
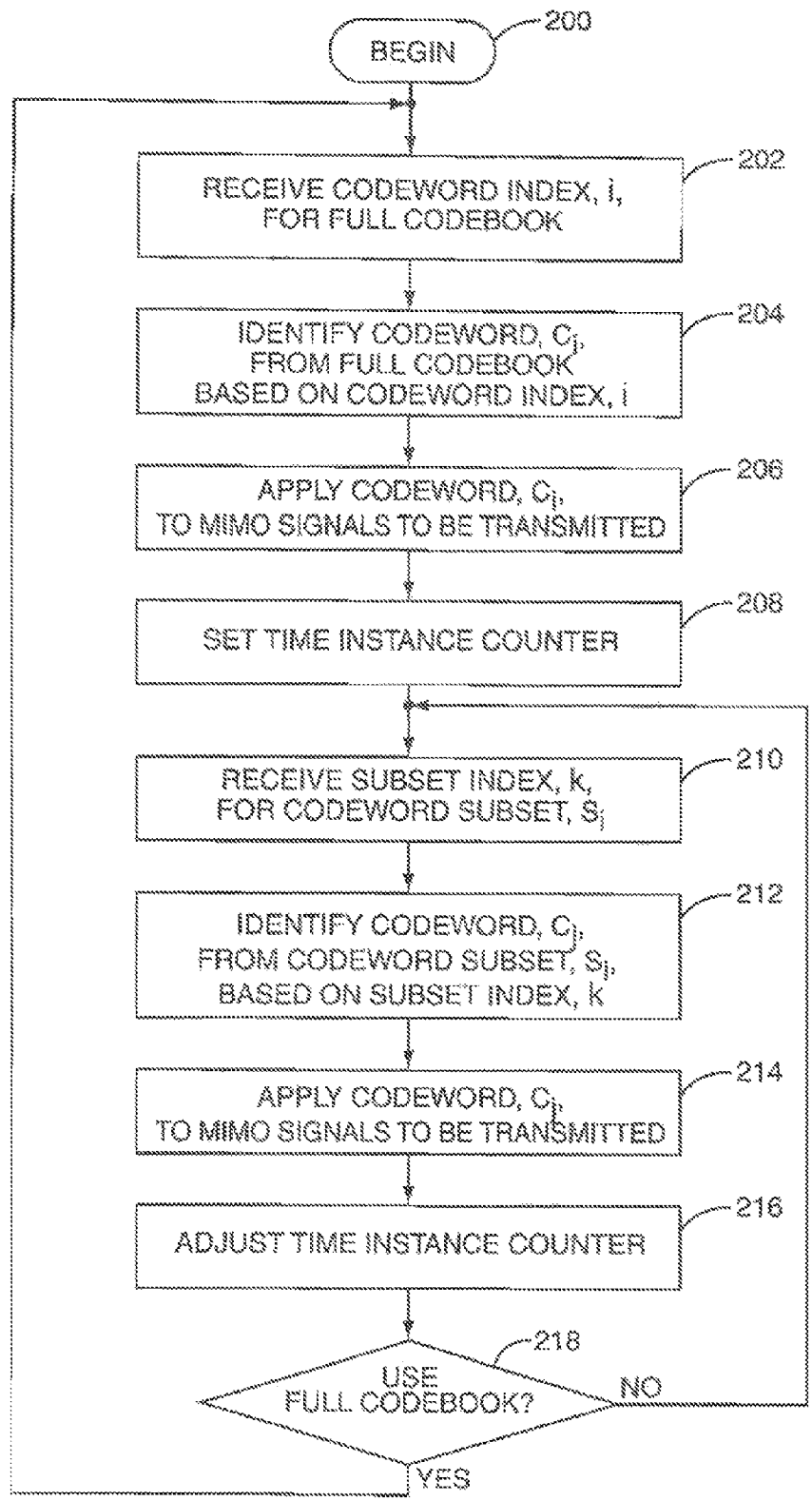
FIG. 6 is a flow diagram illustrating operation of a MIMO transmitter according to one embodiment of the present invention.

With reference to FIG. 6, a flow diagram is provided to illustrate operation of a MIMO transmitter 2 according to one embodiment of the present invention. Operation begins (step 200) where the MIMO transmitter 2 will receive a codeword index i for the full codebook C (step 202). The MIMO transmitter 2 will identify the codeword $c_i$ from the full codebook C based on the codeword index i (step 204). The MIMO transmitter 2 will then apply the codeword $c_1$ to the MIMO signals to be transmitted to the MIMO receiver 6 (step 206). The MIMO transmitter 2 will then set a time instance counter (step 208) and receive a subset index k for the codeword subset $S_i$ (step 210). The MIMO transmitter 2 will be able to identify the codeword subset $S_i$ based on the previous codeword $c_i$ as recovered from the codeword index i from the prior feedback of the MIMO receiver 6. The MIMO transmitter 2 will use the subset index k to identify the codeword $c_j$ from the codeword subset $S_i$ (step 212) and apply the codeword $c_j$ to the MIMO signals to be transmitted (step 214). The MIMO transmitter 2 may then adjust the time instance counter (step 216) and determine whether or not a full codebook C should be used on the next feedback from the MIMO receiver 6 (step 218).

If the codeword subset $S_i$ should be used, the next feedback from the MIMO receiver 6 will identify subset index k for a codeword subset $S_i$ (step 210). The codeword $c_j$ is identified based on the subset index k and applied to the MIMO signals to be transmitted (step 210). This process will continue until the full codebook C is to be used to identify a codeword $c_i$ based on a codebook index i being fed back from the MIMO receiver 6. When it is time to use the full codebook C (step 218), the MIMO receiver 6 will provide a codeword index i (step 202), which will be used by the MIMO transmitter 2 to identify a codeword $c_i$ from the full codebook C (step 204). Codeword $c_i$ will be applied to the MIMO signals to be transmitted (step 206), and the MIMO transmitter 2 will begin receiving subset indices k from the MIMO receiver 6 and identify codeword $c_j$ of the codeword subset $S_i$ based on the subset index k until the full codebook C needs to be accessed again.

Those skilled in the art will recognize that codewords may have various configurations, but in any case will effectively define weighting factors in the form of matrices, vectors, and the like to apply to MIMO signals to be transmitted from the various antennas 4 of the MIMO transmitter 2. Further, cycling between using the full codebook C and a significantly smaller codeword subset $S_i$ may be based on feedback instances, transmission instances, and time periods, as well as the extent to which channel conditions are actually changing. Further, the MIMO transmitter 2 and the MIMO receiver 6 may coordinate with one another to selectively invoke the use of the codeword subsets such that they may operate according to the prior art for a certain period of time or under certain conditions at certain times, while at other times they may operate according to the concepts of the present invention.

Further, for OFDM systems, the codeword subsets may be arranged by time and frequency. As such, the subset indices may relate to and be selected from codebook codewords having the best correlations in the time or frequency direction in the OFDM spectrum.

Figure 7:
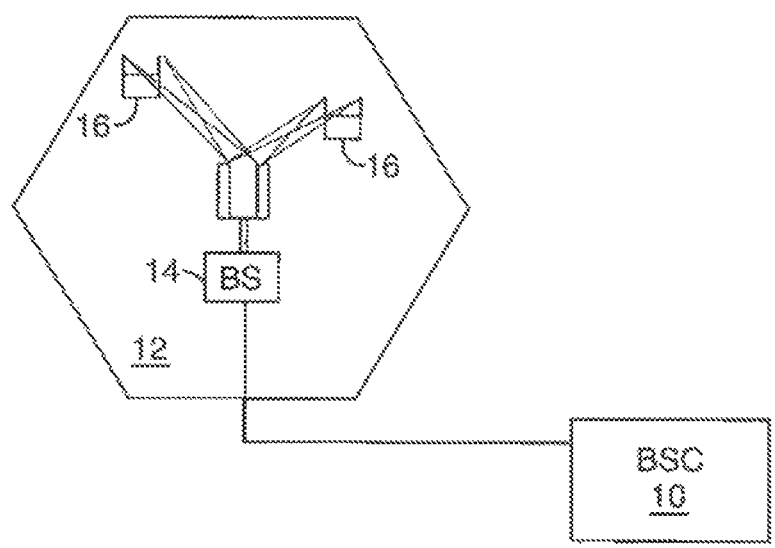
FIG. 7 is a block representation of a wireless communication system according to one embodiment of the present invention.

With reference to FIG. 7, a basic MIMO wireless communication environment is illustrated. In general, a base station controller (BSC) 10 controls wireless communications within one or more cells 12, which are served by corresponding base stations (BS) 14. Each base station 14 facilitates communications with user elements 16, which are within the cell 12 associated with the corresponding base station 14. For the present invention, the base stations 14 and user elements 16 include multiple antennas to provide spatial diversity for communications. Notably, the base station 14 may be any type of wireless access point for cellular, wireless local area network, or like wireless network. For the present invention, the base station 14 and the user elements 16 may act as the MIMO transmitter 2 as well as the MIMO receiver 6. For clarity and conciseness, the following embodiments employ the MIMO transmitter 2 in the base station 14 and MIMO receiver 6 in the user elements 16.

Figure 8:
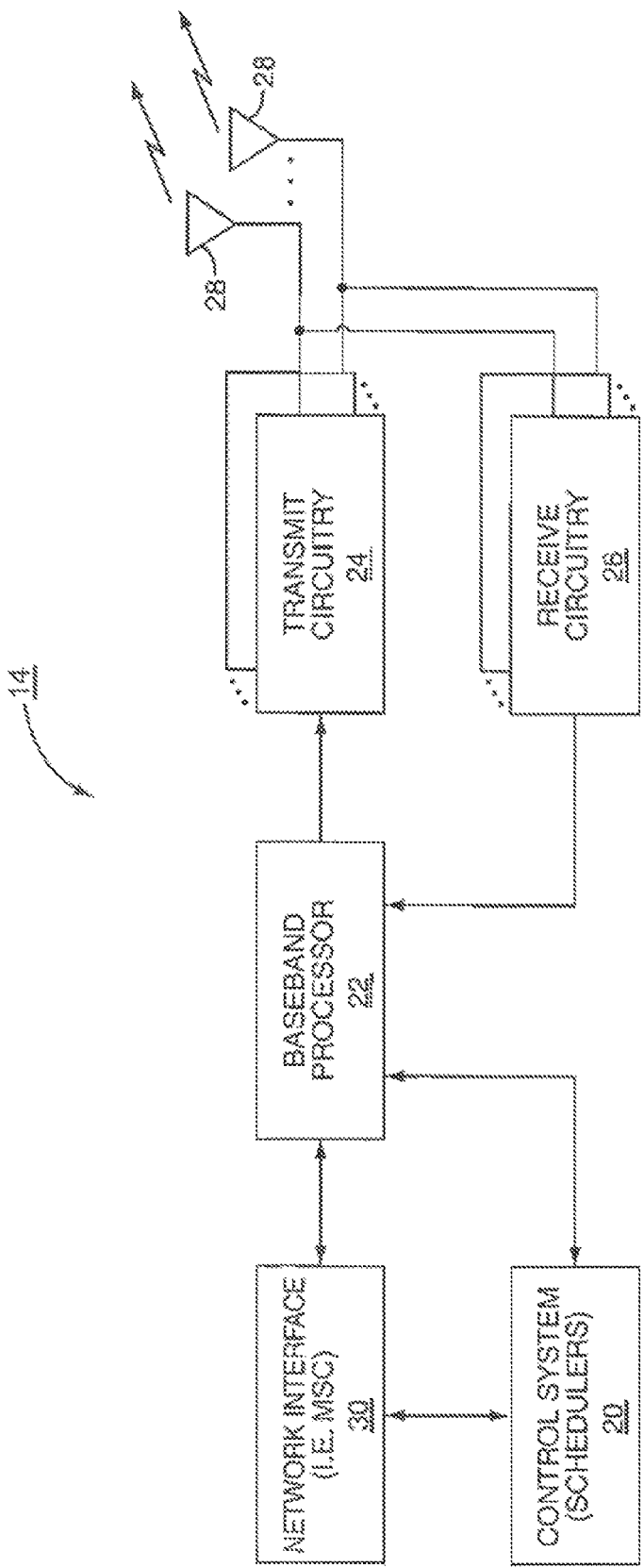
FIG. 8 is a block representation of a base station according to one embodiment of the present invention.

With reference to FIG. 8, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by user elements 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another user element 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity.

Figure 9:
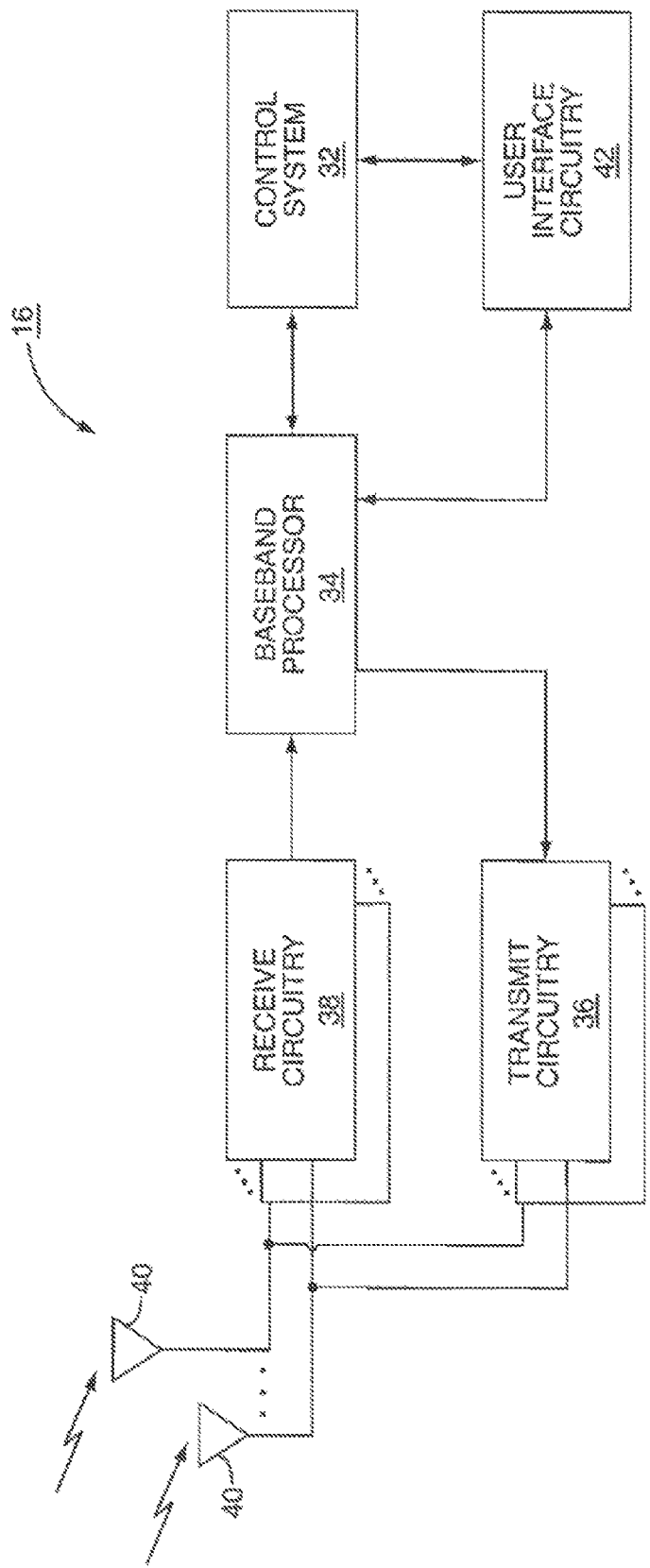
FIG. 9 is a block representation of a user element according to one embodiment of the present invention.

With reference to FIG. 9, a user element 16 configured according to one embodiment of the present invention is illustrated. Similarly to the base station 14, the user element 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application-specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity.

Figure 10:
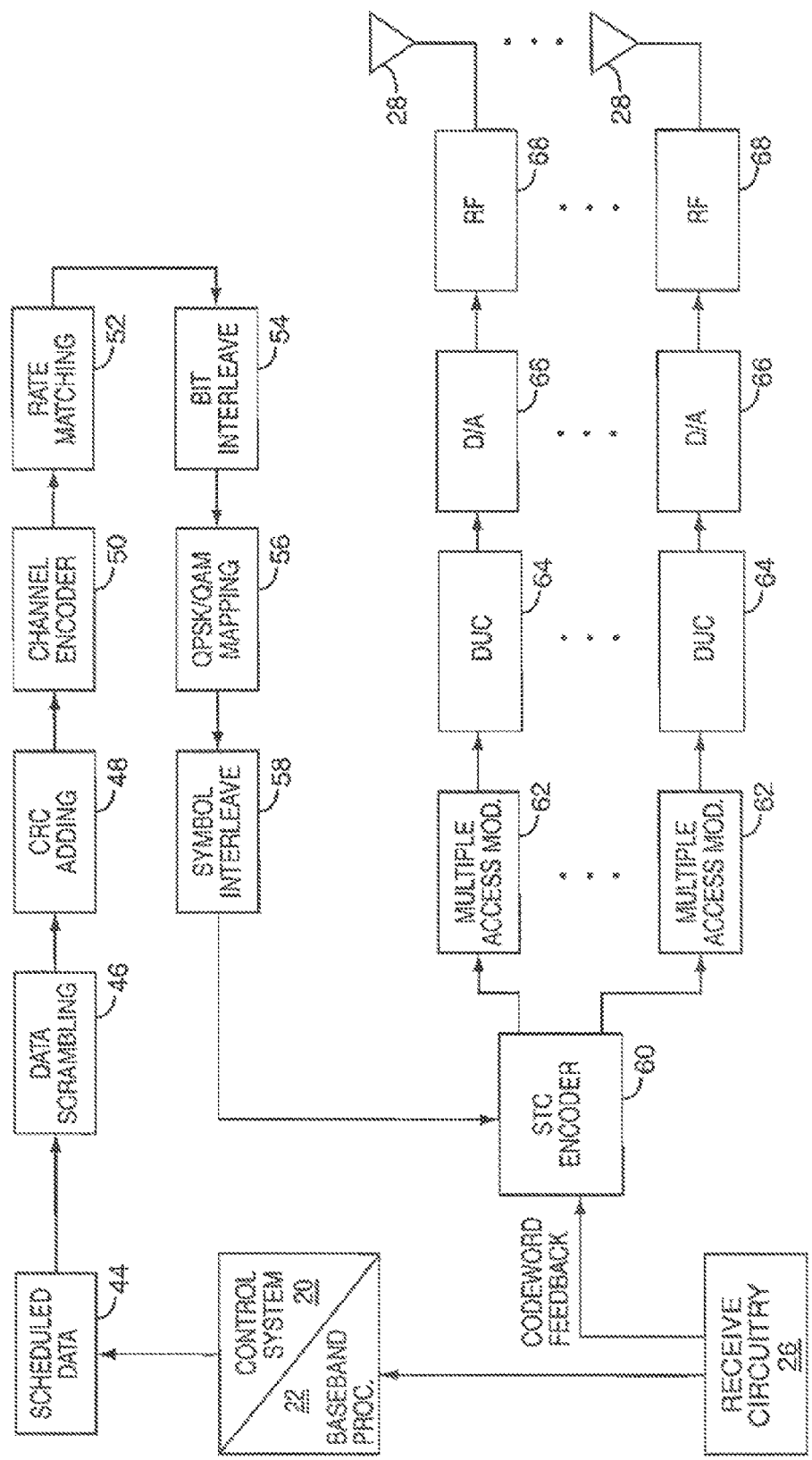
FIG. 10 is a logical breakdown of a MIMO transmitter architecture according to one embodiment of the present invention.

With reference to FIG. 10, a transmission architecture is provided according to one embodiment. The transmission architecture is described as being that of the base station 14, but those skilled in the art will recognize the applicability of the illustrated architecture for both uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the base station controller 10 sends data 44 intended for a user element 16 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel encoding is performed using channel encoder logic 50 to effectively add redundancy to the data to facilitate recovery and error correction at the user element 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, a form of Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time code (STC) encoder logic 60. The STC encoder logic 60 will process the incoming symbols according to a selected STC encoding mode and provide n outputs corresponding to the number of transmit antennas 28 for the base station 14. The codeword feedback from the user element 16 (MIMO receiver 6) is recovered from the corresponding receive circuitry 26 and used to identify the codeword to apply to the symbols. Further detail regarding the SIC encoding is provided later in the description. Assume the symbols for the n outputs are representative of the weighted data to be transmitted and capable of being recovered by the user element 16. Further detail is provided in A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998; R. van Nee, A. van Zelst and G. A. Atwater, "Maximum Likelihood Decoding in a Space Division Multiplex System", IEEE VTC. 2000, pp. 6-10, Tokyo, Japan, May 2000; and P. W. Wolniansky et al., "V-BLAST: An Architecture for Realizing Very High Data Rates over the Rich-Scattering Wireless Channel," Proc. IEEE ISSSE-98, Pisa, Italy, Sep. 30, 1998 which are incorporated herein by reference in their entireties.

For illustration, assume the base station 14 has selected two of a number of antennas 28 (n=2) and the STC encoder logic 60 provides two output streams of symbols. Accordingly, each of the symbol streams output by the STC encoder logic 60 is sent to a corresponding multiple access modulation function 62, illustrated separately for ease of understanding. Those skilled in the art will recognize that one or more processors may be used to provide such analog or digital signal processing alone or in combination with other processing described herein. For example, the multiple access modulation function 62 in a CDMA function would provide the requisite PN code multiplication, wherein an OFDM function would operate on the respective symbols using inverse discrete Fourier transform (IDFT) or like processing to effect an Inverse Fourier Transform.

Each of the resultant signals is up-converted in the digital domain to an intermediate frequency and converted to an analog signal via the corresponding digital up-conversion (DUC) circuitry 64 and digital-to-analog (D/A) conversion circuitry 66. The resultant analog signals are then simultaneously modulated at the desired RF frequency, amplified, and transmitted via the RF circuitry 68 and antennas 28. Notably, the transmitted data may be preceded by pilot signals, which are known by the intended user element 16. The user element 16, which is discussed in detail below, may use the pilot signals for channel estimation and interference suppression and the header for identification of the base station 14.

Figure 11:
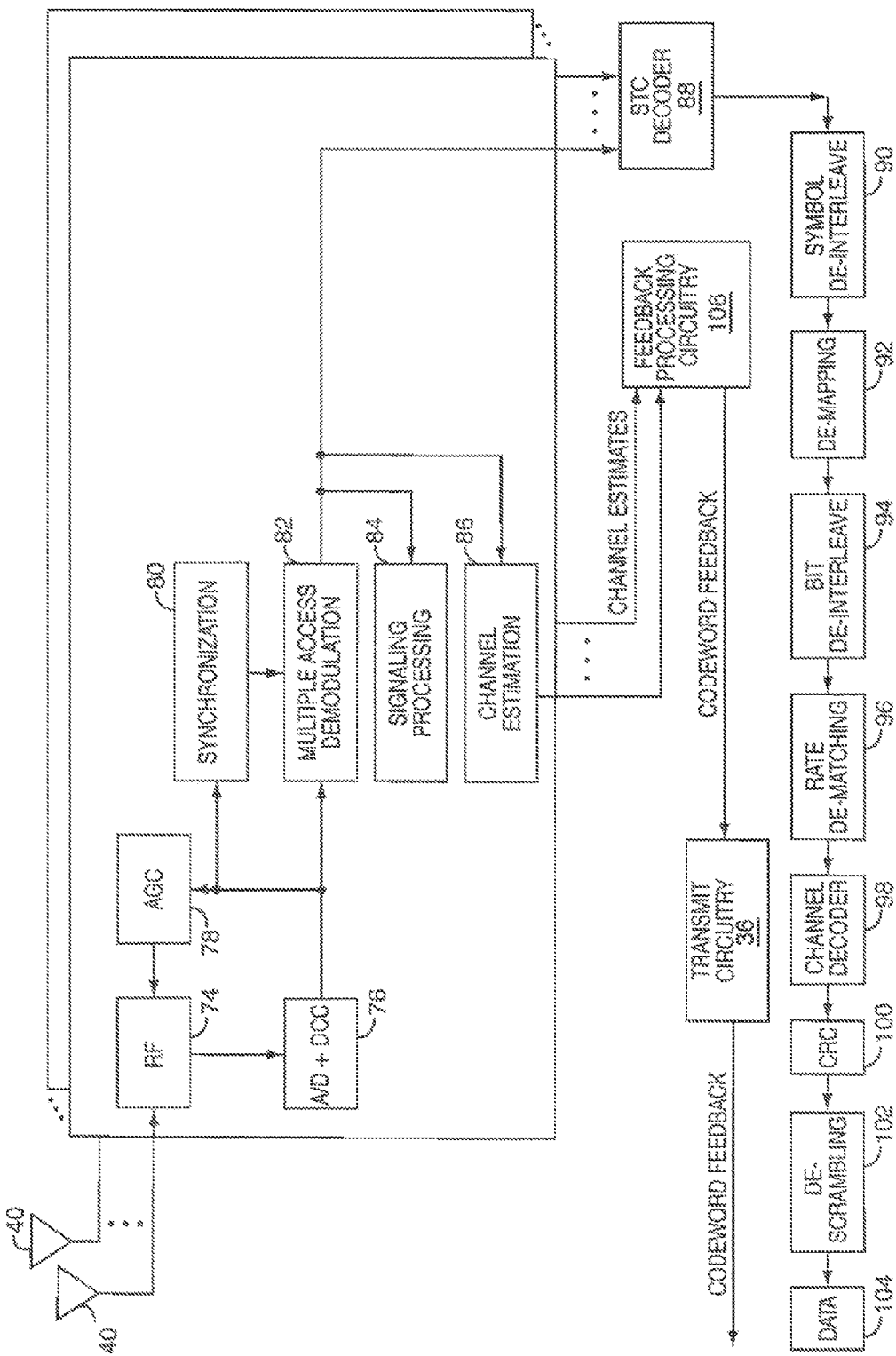
FIG. 11 is a logical breakdown of a MIMO receiver architecture according to one embodiment of the present invention.

Reference is now made to FIG. 11 to illustrate reception of the transmitted signals by a user element 16 and provision of codeword feedback to the base station 14. Upon arrival of the transmitted signals at each of the antennas 40 of the user element 16, the respective signals are demodulated and amplified by corresponding RF circuitry 74. For the sake of conciseness and clarity, only one of the multiple receive paths in the user element 16 is described and illustrated in detail. Analog-to-digital (A/D) conversion and downconversion circuitry (DCC) 76 digitizes and downconverts the analog signal for digital processing. The resultant digitized signal may be used by automatic gain control circuitry (AGC) 78 to control the gain of the amplifiers in the RE circuitry 74 based on the received signal level.

The digitized signal is also fed to synchronization circuitry 80 and a multiple access demodulation function 82, which will recover the incoming signal received at a corresponding antenna 40 in each receiver path. The synchronization circuitry 80 facilitates alignment or correlation of the incoming signal with the multiple access demodulation function 82 to aid in the recovery of the incoming signal, which is provided to a signaling processing function 84 and channel estimation function 86. The signaling processing function 84 processes basic signaling and header information to provide information sufficient to generate a channel quality measurement, which may bear on an overall signal-to-noise ratio for the link, which takes into account channel conditions and/or signal-to-noise ratios for each receive path. The channel estimation function 86 for each receive path provides channel responses corresponding to channel conditions of the MIMO channel.

The symbols from the incoming signal and perhaps channel estimates for each receive path are provided to an STC decoder 88, which provides STC decoding on each receive path to recover the transmitted symbols. The channel estimates may provide channel response information to allow the STC decoder 88 to better decode the symbols according to the STC encoding used by the base station 14.

The recovered symbols are placed back in order using symbol de-interleaver logic 90, which corresponds to the symbol interleaver logic 58 of the base station 14. The de-interleaved symbols are then demodulated or de-mapped to a corresponding bitstream using de-mapping logic 92. The bits are then de-interleaved using bit de-interleaver logic 94, which corresponds to the bit interleaver logic 54 of the transmitter architecture. The de-interleaved bits are then processed by rate de-matching logic 96 and presented to channel decoder logic 98 to recover the initially scrambled data and the CRC checksum. Accordingly, CRC logic 100 removes the CRC checksum, checks the scrambled data in traditional fashion, and provides it to the de-scrambling logic 102 for de-scrambling using the known base station de-scrambling code to recover the originally transmitted data 104.

For the present invention, the channel conditions of the MIMO channel are provided to feedback processing circuitry 106, which will function to determine codewords for the codebook C or codeword subset Si and provide the corresponding indices as codeword feedback to the base station 14 via the transmit circuitry 36. The feedback processing circuitry 106 may be considered part of the control system 32, but is separated for clarity.

Those skilled in the art will recognize improvements and modifications to the preferred embodiments of the present invention. All such improvements and modifications are considered within the scope of the concepts disclosed herein and the claims that follow.

What is claimed is:

1. A method of providing feedback from a multiple-input multiple-output (MIMO) receiver, the method comprising, at the MIMO receiver:
   selecting a first codeword from a plurality of codewords in a codebook based on first channel information at a first time;
   determining second channel information for a MIMO channel at a subsequent time;
   determining a subset of codewords;
   selecting, based on the second channel information, a subset codeword from the subset of codewords; and
   transmitting a subset index for the subset codeword.

2. The method of claim 1, wherein the subset of codewords is determined based on the first codeword.

3. The method of claim 1, wherein the subset of codewords is determined based on the second channel information.

4. The method of claim 1, further comprising, at the MIMO receiver:
   determining the first channel information for the MIMO channel at the first time; and
   transmitting a first codeword index for the first codeword prior to the first time.

5. The method of claim 4, further comprising, at the MIMO receiver, iteratively feeding back new first codeword indices, wherein for each new first codeword index there is a plurality of subset indices for the subset of codebook codewords associated with the new first codeword that is fed back.

6. A multiple-input multiple-output (MIMO) receiver configured for providing feedback, comprising:
- logic configured to select a first codeword from a plurality of codewords in a codebook based on first channel information at a first time;
- logic configured to determine second channel information for a MIMO channel at a subsequent time;
- logic configured to determine a subset of codewords;
- logic configured to select, based on the second channel information, a subset codeword from the subset of codewords; and
- logic configured to transmit a subset index for the subset codeword.

7. The MIMO receiver of claim 6, wherein the logic configured to determine the subset of codewords includes logic configured to determine the subset of codewords based on the first codeword.

8. The MIMO receiver of claim 6, wherein the logic configured to determine the subset of codewords includes logic configured to determine the subset of codewords based on the second channel information.

9. The MIMO receiver of claim 6, further comprising:
- logic configured to determine the first channel information for the MIMO channel at the first time; and
- logic configured to transmit a first codeword index for the first codeword prior to the first time.

10. The MIMO receiver of claim 9, further comprising logic configured to iteratively feed back new first codeword indices, wherein for each new first codeword index there is a plurality of subset indices for the subset of codebook codewords associated with the new first codeword that is fed back.

\* \* \* \* \*